(12) United States Patent
Hemingway et al.

(10) Patent No.: US 6,482,368 B2
(45) Date of Patent: Nov. 19, 2002

(54) NON-THERMAL PLASMA REACTOR FOR LOWER POWER CONSUMPTION

(75) Inventors: Mark David Hemingway, Columbiaville; Thomas Roger Thoreson, Brighton, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/741,782

(22) Filed: Dec. 19, 2000

(65) Prior Publication Data

US 2002/0076368 A1 Jun. 20, 2002

(51) Int. Cl.$^7$ ................................................. B01J 19/08
(52) U.S. Cl. .................... 422/186.04; 204/177
(58) Field of Search ................... 427/186.04; 204/177

(56) References Cited

U.S. PATENT DOCUMENTS 6,007,681 A * 12/1999 Kawamura et al. ......... 204/177

* cited by examiner

Primary Examiner—K. Mayekar
(74) Attorney, Agent, or Firm—Vincent A. Cichosz

(57) ABSTRACT

A dielectric barrier discharge non-thermal plasma reactor system and method for treating a combustion exhaust stream includes admitting an exhaust stream into a non-thermal plasma reactor having at least one segmented non-thermal plasma element including a plurality of individually energizable electrodes defining a plurality of corona volumes. In a preferred embodiment, the individually energizable electrodes are progressively smaller in size in the exhaust flow direction to provide optimum plasma volume variation. Individually energizable electrodes are selectively activated to effect variable corona volumes for treating an exhaust stream. Additional electrode segments may be activated such as during periods of high exhaust flow. The segmented elements may comprise a variety of shapes, such as C-shaped elements, I-shaped elements, planar elements, swept-shaped elements, inter-digitized elements prepared from comb-shaped elements. The system and method are particularly suitable for gas pretreatment and regeneration of a downstream diesel particulate filter.

25 Claims, 2 Drawing Sheets

NON-THERMAL PLASMA REACTOR FOR LOWER POWER CONSUMPTION

TECHNICAL FIELD

The present invention relates non-thermal plasma reactors and more particularly relates to non-thermal plasma reactors and methods for decomposing hazardous compounds in liquids or gases, such as particulate emissions in diesel engine exhaust streams, with reduced power consumption.

BACKGROUND OF THE INVENTION

Certain compounds in the exhaust stream of a combustion process, such as the exhaust stream from an internal combustion engine, are undesirable in that they must be controlled in order to meet government emissions regulations. Among the regulated compounds are hydrocarbons, soot particulates, and nitrogen oxide compounds (NOx). There are a wide variety of combustion processes producing these emissions, for instance, coal-or oil-fired furnaces, reciprocating internal combustion engines (including gasoline spark ignition and diesel engines), gas turbine engines, and so on. In each of these combustion processes, control measures to prevent or diminish atmospheric emissions of these emissions are needed.

Industry has devoted considerable effort to reducing regulated emissions from the exhaust streams of combustion processes. In particular, it is now usual in the automotive industry to place a catalytic converter in the exhaust system of gasoline spark ignition engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metals impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be pre-coated with gamma-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a spark ignition engine is operating under stoichiometric conditions or nearly stoichiometric conditions with respect to the fuel-air ratio just enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system.

However, it is desirable to operate the engine at times under lean burn conditions, with excess air, in order to improve fuel economy. Under lean burn conditions, conventional catalytic devices are not very effective for treating the NOx in the resulting oxygen-rich exhaust stream.

The exhaust stream from a diesel engine also has a substantial oxygen content, from perhaps about 2–18% oxygen, and, in addition, contains a significant amount of particulate emissions. The particulate emissions, or soot, are thought to be primarily carbonaceous particles. It is also believed that other combustion processes result in emissions that are difficult or expensive to control because of, for instance, dilute concentrations of the compounds to be removed from the effluent stream or poor conversion of the compounds using conventional means.

In spite of efforts over the last decade to develop a effective means for reducing NOx to nitrogen under oxidizing conditions in a spark ignition gasoline engine or in an diesel engine, the need for improved conversion effectiveness has remained unsatisfied. Moreover, there is a continuing need for improved effectiveness in treating emissions from any combustion process, particularly for treating the soot particulate emissions from diesel engines.

An alternative way to treat the hydrocarbon, particulate, or NOx emissions in an exhaust or effluent stream is to destroy such emissions using a non-thermal plasma. Plasma is regarded as the fourth state of matter (ionized state of matter). Unlike thermal plasmas, non-thermal plasmas (NTPs) are in gaseous media at near-ambient temperature and pressure but have electron mean energies considerably higher than other gaseous species in the ambient environment. NTP species include electrically neutral gas molecules, charged particles in the form of positive ions, negative ions, free radicals and electrons, and quanta of electromagnetic radiation (photons). These NTP species are highly reactive and can convert hazardous gases to non-hazardous or less hazardous and easily managed compounds through various chemical reaction mechanisms. In contrast to thermal processes (such as thermal plasma), an NTP process directs electrical energy to induce favorable gas chemical reactions, rather than using the energy to heat the gas. Therefore, NTP is much more energy-efficient than thermal plasma.

NTPs can be generated by electric discharge in the gas or injection of electrons into the gas by an electron beam. Among the various types of electric discharge reactors, pulse corona and dielectric barrier (silent) discharge reactors are very popular for their effectiveness and efficiency. However, pulse corona reactors have the major disadvantage of requiring special pulsed power supplies to initiate and terminate the pulsed corona. Consequently, dielectric barrier discharge has become a fast growing technology for pollution control.

Cylindrical and planar reactors are two common configurations for dielectric barrier discharge reactors. Both of these configurations are characterized by the presence of one or more insulating layers in a current path between two metal electrodes, in addition to the discharge space. Other dielectric barrier discharge reactors include packed-bed discharge reactors, glow discharge reactors, and surface discharge reactors.

Dielectric barrier discharge NTP reactor designs based upon the use of one or more dielectric ceramic pieces coated with a conductive material arranged to form the dielectric barrier-conductor-dielectric barrier configurations are known. A stacked shape non-thermal plasma reactor and element for use with diesel engines and the like is disclosed in commonly assigned U.S. patent application Ser. No. 09/511,590 now U.S. Pat. No. 6,338,827 entitled "Design and Method of Manufacturing A Plasma Reactor For Treating Auto Edmissions —Stacked Shapes" , which is hereby incorporated by reference herein in its entirety. Disclosed therein is a non-thermal plasma reactor prepared from a formed shape of dielectric material used as a building block for creating the region of the non-thermal plasma reactor wherein plasma is generated. The formed shape defines an internal cell in the plasma reactor having an exhaust passage for flowing exhaust gas to be treated therethrough. A conductive print forming an electrode and connector is disposed on at least one wall of each of the cells, and outer insulative plates, disposed on opposite ends of the multi-cell stack, are provided to protect the conductive print.

Difficulties in the practical use of dielectric barrier discharge reactors include an expensive power supply, a low energy efficiency and flow rate, and the blocking of discharge volume by dusts in the feed gas and or solid mineral compounds produced during the plasma reactions. Power control to the NTP reactor is typically accomplished by varying a combination of voltage and frequency in response to varying engine conditions such as exhaust flow and constituent level. The size, cost and impact on fuel economy of providing such high power loads renders non-thermal plasma reactors non-feasible commercially for transportation applications. For example, currently available on-thermal plasma (NTP) reactors having stacked plate configurations require high level of power (approximately 2 kW) to effectively treat the quantity of combustion exhaust gas produced from 2-liter diesel engines. Further, particulate and fuel deposits are known to collect on the NTP reactor plates, greatly diminishing reactor efficiency after a short period of operation.

What is needed in the art is an improved NTP reactor and method providing effective and economically efficient treatment of combustion exhaust streams.

SUMMARY OF THE INVENTION

The present invention comprises a non-thermal plasma reactor and method providing optimal voltage and frequency for transfer through the power supply while varying the active corona volume. In one embodiment, variable corona volumes are achieved with a non-thermal plasma reactor employing one or more segmented reactor plates, each segmented reactor plate having a plurality of selectively energizable electrodes, to best enable overall plasma volume variation and greatest span of possible volumes. Most preferably, the selectively energizable electrodes are progressively smaller in size along the exhaust flow direction. A reactor in accordance with this embodiment comprises, for example, a first electrode providing a first a volume, a second electrode providing a second volume that is half the size of the first volume, and a third electrode having a third volume that is half the size of the second volume. During system operation, power is applied to selectively energize conductors in individual electrodes to control the active corona volume as desired in accordance with the quantity and nature of the particular exhaust stream being treated. For example, the smallest electrode volume segments disposed nearest the exhaust outlet end are energized first and electrode segments in the central and exhaust inlet areas are energized progressively, in turn, in response to increasing exhaust flow. In alternate embodiments, the segmented reactor elements include any suitable element configuration, including C-shaped, I-shaped, planar, swept-shaped, or inter-digitized devices prepared from comb-shaped reactor elements.

An optimized high space velocity in the active corona volume is maintained by selectively applying power to an individual reactor segment and applying power to additional reactor segments only as needed for efficient treatment of the exhaust stream thereby minimizing power consumption. For example, additional reactor segments may be energized during periods of high exhaust flows.

The present reactors are particularly suitable for pretreating gases to effect NOx to $N_2$ conversion across a specialized catalyst. The present reactors are also particularly suitable for cleaning and regenerating a down stream diesel particulate filter.

Advantageously, the present system and method for maintaining high space velocity in the active corona volume minimizes deposition of particulate matter and fuel on the NTP reactor surfaces which can inhibit reactor performance over time. Advantageously, the present NTP reactor provides reduced power consumption by at least about 40% over previously available reactors, without further system optimization.

These and other features and advantages of the invention will be more fully understood from the following description of certain specific embodiments of the invention taken together with the accompanying drawings.

BRIEF DESCRIPTION OF THE DRAWINGS

Referring now to the drawing, which is meant to be exemplary, not limiting.

DESCRIPTION OF THE PREFERRED EMBODIMENT

Figure 1:
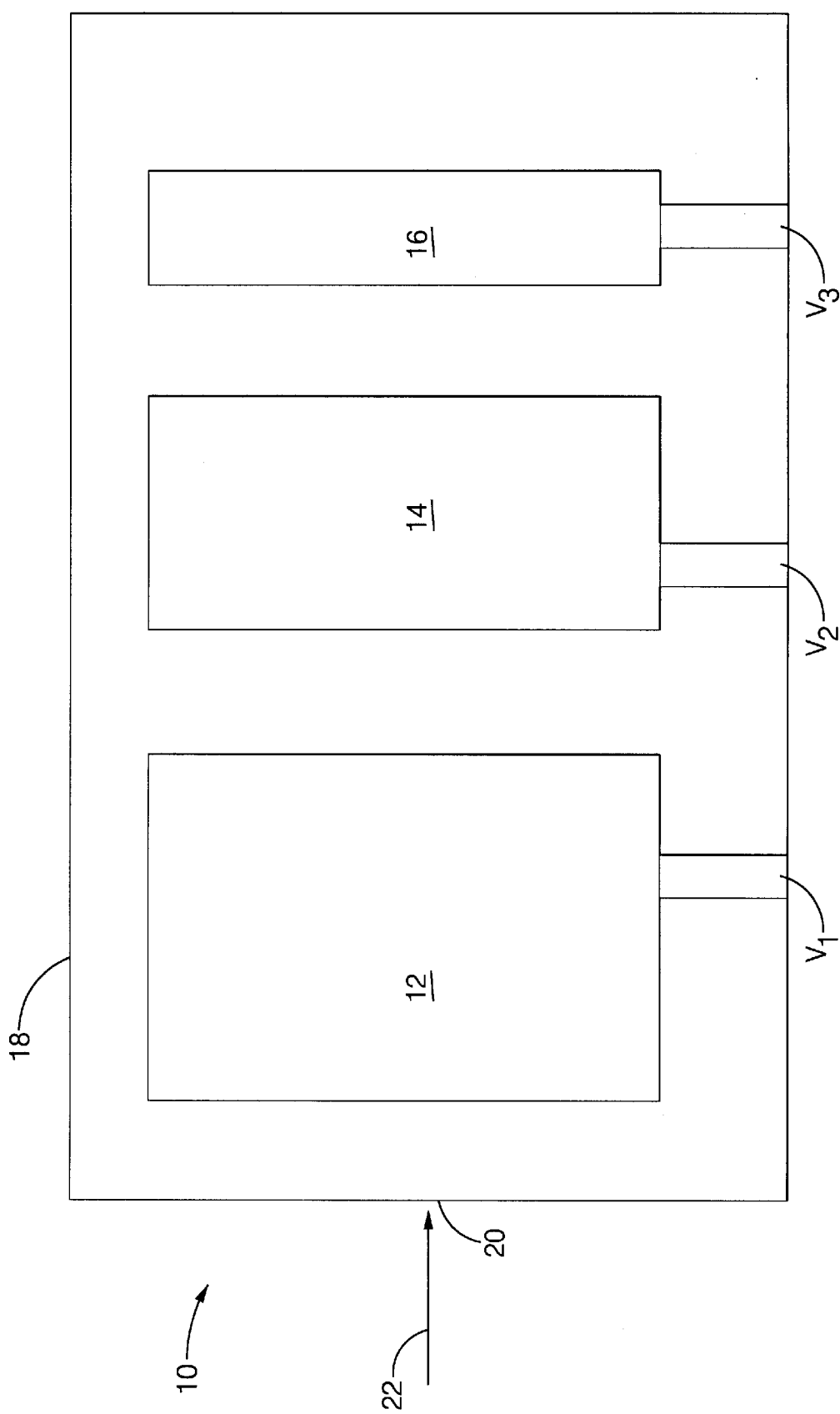
FIG. 1 provides a schematic representation of a NTP reactor having segmented reactor plates comprising selectively energizable electrodes in accordance with the present invention.

FIG. 1 is a schematic view of a segmented parallel plate reactor 10 having selectively energizable electrodes 12, 14, 16 for generating a non-thermal plasma in accordance with one possible embodiment of the present invention. This embodiment provides differential sizing for electrodes 12, 14, 16, electrode 12 having a first size for generating a corona volume $V_1$, electrode 14 having a second size that is about half the size of electrode 12 for generating a corona volume $V_2$, and electrode 16 having a third size that is about half the size of electrode 14 for generating a corona volume $V_3$. The non-thermal plasma reactor 10 stack comprising a plurality of plates 11 is disposed in a housing 18 having a fluid inlet 20 for ingress of fluid such as a diesel engine exhaust stream 22 and a fluid outlet (not shown in FIG. 1) for discharging the treated exhaust stream.

Figure 2:
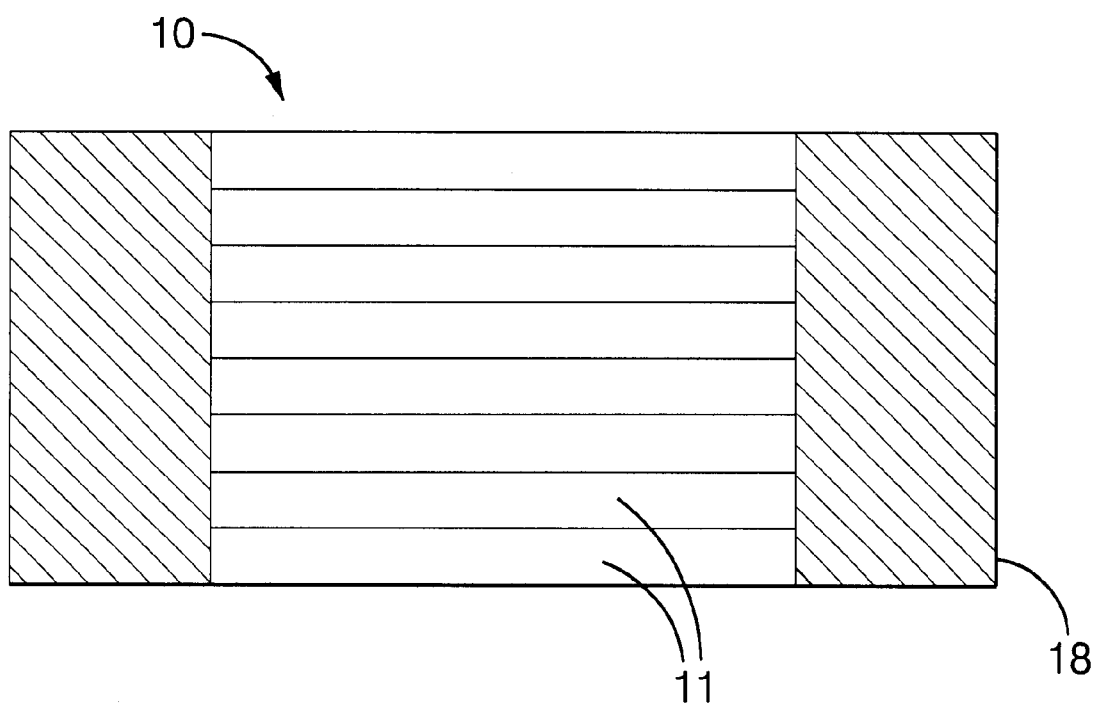
FIG. 2 provides a front inlet view of a parallel plate reactor stack prepared with a plurality of segmented reactor plates in accordance with the present invention.

FIG. 2 shows a front inlet view of the reactor 10 having a plurality of alternating power and ground electrode coated plates 11, each plate 11 including a plurality of selectively energizable electrodes 12, 14, 16 having progressively smaller corona volumes $V_1$, $V_2$, and $V_3$, respectively.

The plurality of electrodes each preferably includes differential sizing to enable optimum plasma volume variation, the quantity being determined by the requirements of the fluid being treated. Individual NTP electrodes 12, 14, 16 comprise a conductor formed from, for example, stainless steel, embedded between two opposing layers of dielectric material to form the reactor element. The dielectric layers may comprise glass, quartz, ceramic, Teflon, or epoxy, for example. Conductors are connected to power and ground so that adjacent electrodes have opposite polarity. The present non-thermal plasma reactors are highly adaptable and may have elements provided in a variety of configurations, including C-shaped, I-shaped, planar, swept-shaped, or inter-digitized devices prepared from comb-shaped reactor elements.

The separation between adjacent electrodes defines individual reaction volumes or discharge volumes, through which the passing fluid stream 22 is treated. In prior NTP reactor designs, the adjacent electrodes are connected together in series so that the entire system is either turned on (fully powered) or off. By selectively applying power to an individual reactor segment (such as electrode 16) and applying power to additional reactor segments (e.g., electrodes 14 and 12) only as needed for efficient treatment of the exhaust stream 22, an optimized high space velocity in the active corona volume $V_3$ or volumes $V_2$, $V_1$, is maintained. For example, additional conductors in electrodes 14 and 12 may be energized during periods of high exhaust flows.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A non-thermal plasma reactor exhaust treatment system for a combustion process comprising:
   a housing having a fluid inlet for admitting an exhaust stream to be treated and a fluid outlet for discharging a treated stream;
   at least one segmented dielectric barrier discharge non-thermal plasma element disposed in said housing, said element comprising a plurality of electrode plates having differentially sized individually energizable electrodes;
   wherein during system operation, said individually energizable electrodes are selectively activated to effect variable corona volumes for treating said exhaust stream.

2. The system of claim 1, wherein an optimized high space velocity in an active corona volume is maintained by selectively activating an individually energizable electrode and activating additional individually energizable electrodes only as needed for efficient treatment of the exhaust stream.

3. The system of claim 1, wherein additional individually energizable electrodes are activated during periods of high exhaust flows.

4. The system of claim 1, wherein said segmented elements comprise C-shaped elements, I-shaped elements, planar elements, swept-shaped elements, comb-shaped elements, or a combination thereof.

5. The system of claim 1, wherein said differentially sized electrodes comprise progressively smaller electrodes.

6. The system of claim 1, wherein said system further comprises a pretreatment system for treating an exhaust stream prior to passing said exhaust stream through a catalytic converter.

7. The system of claim 1, wherein said system further comprises a regeneration system for a downstream diesel particulate filter.

8. A segmented element for a non-thermal plasma reactor comprising:
   a plurality of dielectric barrier electrode plates having differentially sized individually energizable electrodes;
   wherein during non-thermal plasma reactor operation, said individually energizable electrodes are selectively activated to effect variable corona volumes for treating said exhaust stream; and further
   wherein additional individually energizable electrodes are activated during periods of high exhaust flows.

9. The segmented element of claim 8, wherein an optimized high space velocity in an active corona volume is maintained by selectively activating individually energizable electrodes and activating additional individually energizable electrodes only as needed for efficient treatment of the exhaust stream.

10. The segmented element of claim 8, wherein said segmented elements comprise C-shaped elements, I-shaped elements, planar elements, swept-shaped elements, inter-digitized elements prepared from comb-shaped elements, or a combination thereof.

11. The segmented element of claim 8, wherein said differentially sized electrodes comprise progressively smaller electrodes.

12. A method for treating a combustion exhaust stream comprising:
   admitting an exhaust stream into a dielectric barrier discharge non-thermal plasma reactor comprising: a housing having a fluid inlet for admitting a flow of exhaust and a fluid outlet for discharging a treated stream; at least one segmented non-thermal plasma element disposed in said housing, said element comprising a plurality of electrode plates having differentially sized individually energizable electrodes;
   selectively activating said individually energizable electrodes to effect variable corona volumes for treating said exhaust stream.

13. The method of claim 12, further comprising:
   selectively activating an individually energizable electrode and activating additional individually energizable electrodes only as needed for efficient treatment of the exhaust stream so as to maintain a high space velocity in each active corona volume.

14. The method of claim 12, further comprising:
   activating additional individually energizable electrodes during periods of high exhaust flows.

15. The method of claim 12, wherein said segmented elements comprise C-shaped elements, I-shaped elements, planar elements, swept-shaped elements, inter-digitized elements prepared from comb-shaped elements, or a combination thereof.

16. The method of claim 12, wherein said individually energizable differentially sized electrodes are progressively smaller in the exhaust flow direction.

17. The method of claim 12, wherein said method further comprises a pretreatment method for treating an exhaust stream prior to passing said exhaust stream through a catalytic converter.

18. The method of claim 12, wherein said method further comprises a regeneration method for a downstream diesel particulate filter.

19. A method for treating an exhaust stream comprising:
   admitting an exhaust stream into a non-thermal plasma reactor comprising: a housing having a fluid inlet for admitting a flow of exhaust and a fluid outlet for discharging a treated stream; at least one differentially sized segmented non-thermal plasma element disposed in said housing, said element comprising a plurality of segments having individually energizable electrodes;
   selectively activating an individually energizable electrode and activating additional individually energizable electrodes as needed for efficient treatment of the exhaust stream so as to maintain a high space velocity in each active corona volume; and activating additional individually energizable electrodes during periods of high exhaust flows.

20. The method of claim 19, wherein said segmented elements comprise C-shaped elements, I-shaped elements, planar elements, swept-shaped elements, inter-digitized elements prepared from comb-shaped elements, or a combination thereof.

21. The method of claim 19, wherein said individually energizable differentially sized electrodes are progressively smaller in size in the exhaust flow direction.

22. The method of claim 19, wherein said method further comprises a pretreatment method.

23. The method of claim 19, wherein said method further comprises a down stream regeneration method for a diesel particulate filter.

24. The segmented element of claim 8, wherein said individually energizable differentially sized electrodes are progressively smaller in the flow direction.

25. The system of claim 1, wherein said individually energizable differentially sized electrodes are progressively smaller in the exhaust flow direction.

* * * * *